(12) United States Patent
Chernenko et al.

(10) Patent No.: US 12,518,105 B2
(45) Date of Patent: Jan. 6, 2026

(54) SEMANTIC DOMAIN ASSIGNMENT REFERENCING GOVERNANCE DOMAINS AND TERM DATABASES

(71) Applicant: SAP SE, Walldorf (DE)

(72) Inventors: Tetyana Chernenko, Heidelberg (DE); Benjamin Schork, Wilhelmsfeld (DE); Marcus Danei, Plankstadt (DE)

(73) Assignee: SAP SE, Walldorf (DE)

( * ) Notice: Subject to any disclaimer, the term of this patent is extended or adjusted under 35 U.S.C. 154(b) by 327 days.

(21) Appl. No.: 18/304,640

(22) Filed: Apr. 21, 2023

(65) Prior Publication Data

US 2024/0354511 A1    Oct. 24, 2024

(51) Int. Cl.
*G06F 40/30* (2020.01)
*G06F 40/58* (2020.01)

(52) U.S. Cl.
CPC .............. *G06F 40/30* (2020.01); *G06F 40/58* (2020.01)

(58) Field of Classification Search
None
See application file for complete search history.

(56) References Cited

U.S. PATENT DOCUMENTS

| | | | | |
|---|---|---|---|---|
| 9,552,334 B1 * | 1/2017 | Meisels | ................... | G06Q 50/01 |
| 2006/0212294 A1 * | 9/2006 | Gorin | ...................... | G10L 15/18 |
| | | | | 704/E15.018 |
| 2010/0153090 A1 * | 6/2010 | Chen | ...................... | G06F 40/30 |
| | | | | 707/706 |
| 2014/0214419 A1 * | 7/2014 | Rao | ...................... | G10L 15/063 |
| | | | | 704/240 |
| 2019/0171846 A1 * | 6/2019 | Conikee | .............. | G06F 21/6245 |
| 2020/0184014 A1 * | 6/2020 | Ahaus | ..................... | G06F 40/30 |

FOREIGN PATENT DOCUMENTS

JP    2006201873 A  *  8/2006

OTHER PUBLICATIONS

U.S. Patent Application entitled "System and Method Performing Terminology Disambiguation" U.S. Appl. No. 18/059,237, filed Nov. 28, 2022, 33 pages.

* cited by examiner

*Primary Examiner* — Quynh H Nguyen
(74) *Attorney, Agent, or Firm* — Fountainhead Law Group, PC

(57) ABSTRACT

Embodiments relate to systems and methods that improve the definition of semantic domains within incoming data, and accurately distribute data over those defined domains. In a particular embodiment, company-specific terminology and data governance (d.g.) domains are used to define "highly semantically loaded" terms within an incoming linguistic data corpus having existing semantic domains assigned thereto. Analyzing distribution patterns of such highly semantically loaded terms across the incoming linguistic data (and/or across the d.g. domains) enhances the accuracy of assignment of semantical domains and distribution of the data across these domains. Such improved semantic domains can improve operation of computers tasked with downstream processing of the linguistic data—e.g., by Natural Language Processing (NLP).

16 Claims, 20 Drawing Sheets

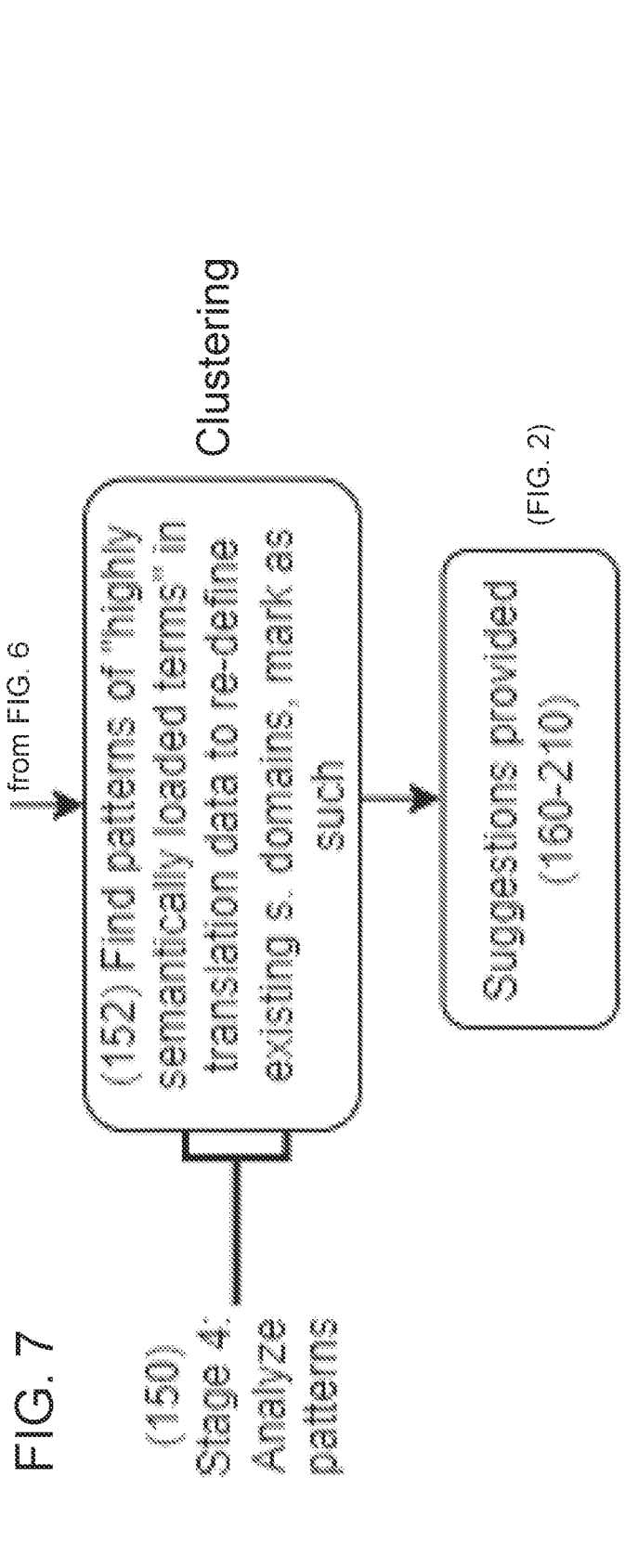

| Relation | Meaning |
|---|---|
| "one/several/many ~ to ~ one" relation: | - a term has only one d .g. domain from the list and one d .g. domain referring to other current translation domain X<br>-> The number of occurrences must be compared (sum of all occurrences of d .g. domains from the list above vs. occurrences of d .g. domain from other current domain).<br>If the difference is higher than a threshold, A is *probably a correctly defined domain*. Another domain X is a candidate for the *overlapping domains* (-> A and X can be potentially joined to one domain).<br>- a term has several d .g. domains from the list and one d .g. domain referring to other current translation domain<br>-> The number of occurrences must be compared (sum of all occurrences of d .g. domains from the list above vs. all occurrences of d .g. domain from other current domain).<br>If the difference is higher than a threshold, A is *probably a correctly defined domain*. Another domain X is a candidate for the *overlapping domains* (-> A and X can be potentially joined to one domain).<br>- a term has many d .g. domains from the list and one d .g. domain referring to other current translation domain<br>-> A is a correctly defined domain. Another domain X is a candidate for the *overlapping domains* (-> A and X can be potentially joined to one domain). |

| Relation | Meaning |
|---|---|
| "one/several/many — to several" relation: | - a term has only one d. g. domain from the list and several d. g. domains referring to several other current translation domain/domains<br>-> The number of occurrences must be computed (occurrences of d. g. domains from the list above vs. all occurrences of d. g. domains from other current domain/domains)<br>  If the difference is higher than a threshold, A is *suitable a correctly defined domain*<br>  Other domains are candidates for the *constitution domain(s) f -> A and X can be potentially joined to one domain).*<br><br>- a term has several d. g. domains from the list and several d. g. domains referring to several other current translation domain/domains<br>-> The number of occurrences must be computed (sum of all occurrences of d. g. domains from the list above vs. all occurrences of d. g. domains from other current domain/domains). If the difference is higher than a threshold, A is *probably* a correctly defined domain<br>  Other domains are candidates for the *constitution domains f -> A and X can be potentially joined to one domain).*<br><br>- a term has many d. g. domains from the list and several d. g. domains referring to several other current translation domain/domains<br>-> The number of occurrences must be computed (sum of all occurrences of d. g. domains from the list above vs. all occurrences of d. g. domains from other current domain/domains). If the difference is higher than a threshold, A is *probably a correctly defined domain*<br>  Other domains are candidates for the *constitution domains f -> A and X can be potentially joined to one domain).* |

| Relation | Meaning |
|---|---|
| "one/several/many – to – many" relation: | "one/several/many-to-one/several": <br> - a term has only one d. g. domain from the list and many d. g. domains referring to other current translation domain/domains <br> → *Probably not* a correctly defined domain. The number of occurrences must be compared (occurrences of an d. g. domain from the list above vs. all occurrences of d. g. domains from other current domain). If the difference is higher than a threshold, A is *probably* a correctly defined domain <br><br> - a term has several d. g. domains from the list and many d. g. domains referring to other current translation domain/domains <br> → *Probably not* a correctly defined domain. The number of occurrences must be compared (all occurrences of an d. g. domain from the list above vs. all occurrences of d. g. domains from other current domain/domains). If the difference is higher than a threshold, A is *probably* a correctly defined domain <br><br> - a term has many d. g. domains from the list and many d. g. domains referring to other current translation domain/domains <br> → *Probably not* a correctly defined domain. The number of occurrences must be compared (all occurrences of d. g. domains from the list above vs. all occurrences of d. g. domains from other current domain/domains). If the difference is higher than a threshold, A is *probably* a correctly defined domain |

FIG. 11

SEMANTIC DOMAIN ASSIGNMENT REFERENCING GOVERNANCE DOMAINS AND TERM DATABASES

BACKGROUND

Unless otherwise indicated herein, the approaches described in this section are not prior art to the claims in this application and are not admitted to be prior art by inclusion in this section.

Natural Language Processing (NLP) is an interdisciplinary field combining linguistics, computer science, and artificial intelligence where raw language inputs (rather than specific commands) are received as input. NLP finds possible use in a variety of possible applications, including but not limited to automated translation and many others.

The quality of results returned by NLP systems can depend upon identification of semantical domains within data. Thus, the accurate assignment of proper domains to incoming data corpuses can improve the quality of results from NLP that is to be performed.

SUMMARY

Embodiments relate to systems and methods that improve the definition of semantic domains within incoming data, and accurately distribute data over those defined domains. In a particular embodiment, company-specific terminology and data governance (d.g.) domains are used to define "highly semantically loaded" terms within an incoming linguistic data corpus having existing semantic domains assigned thereto. Analyzing distribution patterns of such highly semantically loaded terms across the incoming linguistic data (and/or across the d.g. domains) enhances the accuracy of assignment of semantical domains and distribution of the data across these domains. Such improved semantic domains can improve operation of computers tasked with downstream processing of the linguistic data—e.g., by Natural Language Processing (NLP).

The following detailed description and accompanying drawings provide a better understanding of the nature and advantages of various embodiments.

BRIEF DESCRIPTION OF THE DRAWINGS

FIG. 7 show details of fourth and later stages according to the example.

FIGS. 8-11 are tables showing meanings for different relations in the example.

DETAILED DESCRIPTION

Described herein are methods and apparatuses that implement domain assignment. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 12:
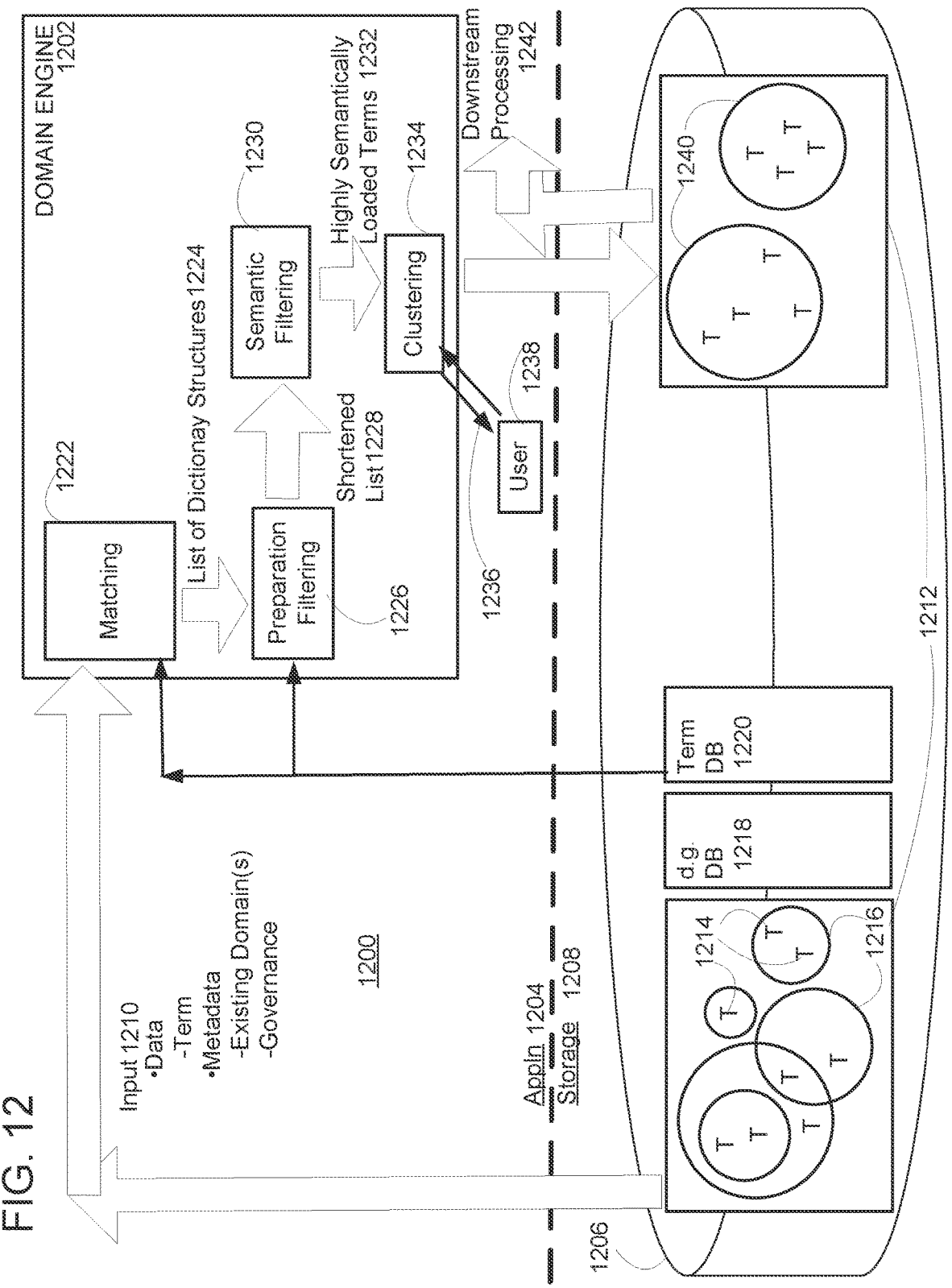
FIG. 12 shows a simplified diagram of a system according to an embodiment.

FIG. 12 shows a simplified view of an example system that is configured to implement domain assignment according to an embodiment. Specifically, system 1200 comprises a domain engine 1202 within application layer 1204, that is in communication with a non-transitory computer readable storage medium 1206 of a storage layer 1208.

The domain engine is configured to receive as an input 1210, incoming data corpus 1212. That data corpus comprises terms (T) 1214, as well as existing semantic domains 1216 (shown by circles) to which data containing those terms are assigned. The data corpus also comprises data governance domains from d.g. database 1218 to which data containing those data governance domains are assigned.

In this highly simplified example, the existing domain assignments are as follows:
one (1) existing semantic domain including four (4) terms; and
three (3) existing semantic domains including two (2) terms each;
total of four (4) existing semantic domains.

It is the role of the domain engine, to:
improve,
define more precisely, and/or
reduce a number of the domains that are assigned in the incoming data set.

In order to accomplish these goal(s), the domain engine is configured to reference two other sources of information that are present in the storage layer. The data governance ("d.g.") domain database 1218 includes data governance domains representing a logical grouping of items of interest to a particular organization (e.g., products of a company), or areas of interest within the organization (e.g., internal company structure by department).

These d.g. domains represent high-level categories of data for the purpose of assigning accountability and responsibility for the data—e.g., Human Resources (HR) functionalities, specific products, or many others. Alternatively, instead of d.g. domains, other non-semantical categories in linguistic data may be used.

The terminology database 1220 is also referenced by the domain engine. The term database is an industry- or company-specific terminology dataset.

The terminology dataset can be referenced to distinguish uniqueness of potentially ambiguous terms. For example, the incoming data set may comprise the term "amazon", which may refer to a river or the well-known electronics company.

At 1222, the domain engine matches terms from the terminology dataset in the linguistic data. For this matching, case-insensitive exact match or techniques more sophisticated than exact matching, can be employed.

For each matched term, the following is stored:
its occurrences in data,
occurrences of the d.g. domains; and
other metadata.

The output of the matching is a list 1224 of dictionary structures.

At 1226, preparation filtering is performed by the domain engine. Here, ambiguous terms are filtered out, with the result being a shortened list 1228 of dictionary structures.

Next, the domain engine performs semantic filtering 1230. Here the domain engine analyzes statistical distributions of the terms of the shortened list within d.g. domains, statistical distributions of the d.g. domains within terms of the shortened list, and performs filtering. The outcome of this comparison comprises highly semantically loaded terms 1232 of the data set. Further details regarding semantic filtering according to a sample embodiment, are described in the example.

Once the highly semantically loaded terms are identified by the semantic filtering, the domain engine performs a clustering function 1234. This clustering involves creating and exploring statistical distributions of the highly semantically loaded terms across the incoming data corpus.

The data is clustered based on the highly semantically loaded terms as semantical signifiers. For that clustering, two categories of term patterns in translation data may be defined and considered:
a first category considers only distribution of terms across existing domains.
a second category looks deeper and considers distribution of d.g. domains across the terms themselves, as well.

These statistical distributions are then referenced to provide suggestions 1236 for new/revised domains. The proposed suggestions may be accepted, rejected, and/or saved for later reference by the user 1238. Further details regarding clustering are also provided below in the specific exemplary embodiment.

The highly simplified example of FIG. 12 shows that as a result of the clustering, the incoming data set now includes revised domains 1240. Here, the assigned domains are:
one (1) semantic domain including four (4) terms—corresponding to an existing domain;
one (1) semantic domain including four (4) terms—corresponding to a new domain.
total of two (2) semantic domains.

It is noted that the operation of the domain engine may not necessarily change an existing domain. Thus here the existing four-term remains unaltered, but the total number of domains is simplified by being reduced from four to two.

The revised semantic domain assignments are now ready for reference as metadata for the purposes of downstream processing 1242 (e.g., NLP-based software application or platform) utilizing the data set. The more accurate and/or simplified nature of the revised domain assignments can improve performance of such downstream processing.

In certain embodiments, the revised domain assignments can be used as features for Neural Machine Translation (NMT). In particular embodiments, the revised domain assignments can be used as labels for automatic recognition of domains for new translation data. Embodiments can thus conserve time and cost for translation processes, improve the reusage of data and the quality of services working with translation data (e.g., NMT, chatbots—particularly chatbots based on large language models, search services, dialogue systems, voice recognition and translation, and many others).

The specific example described below focuses upon implementation of semantic domain assignment in the context of automated translation. However, embodiments are not limited to this particular application. Other possible use cases in which embodiments may find application can include but are not limited to: search engines, information retrieval and information extraction applications, neural machine translation, chatbots, question answering or dialogue systems, language and descriptions generation, word sense disambiguation, and information classification and summarization.

Figure 1:
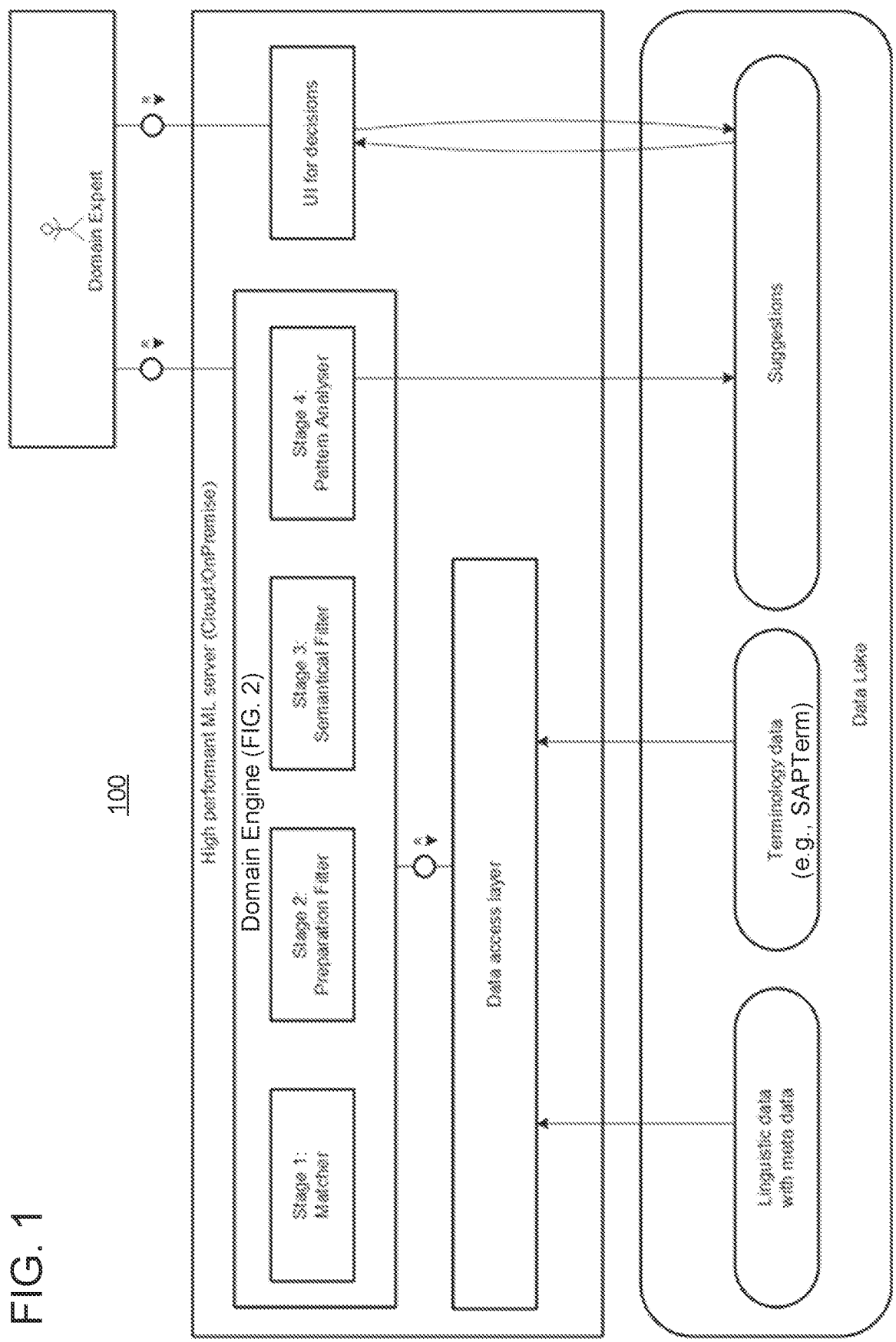
FIG. 1 shows a component diagram of a system according to one example.

While FIG. 1 shows the further analysis as occurring downstream of the domain engine, this is not required. In certain embodiments, the domain engine itself can perform the NLP or other processing.

Figure 13:
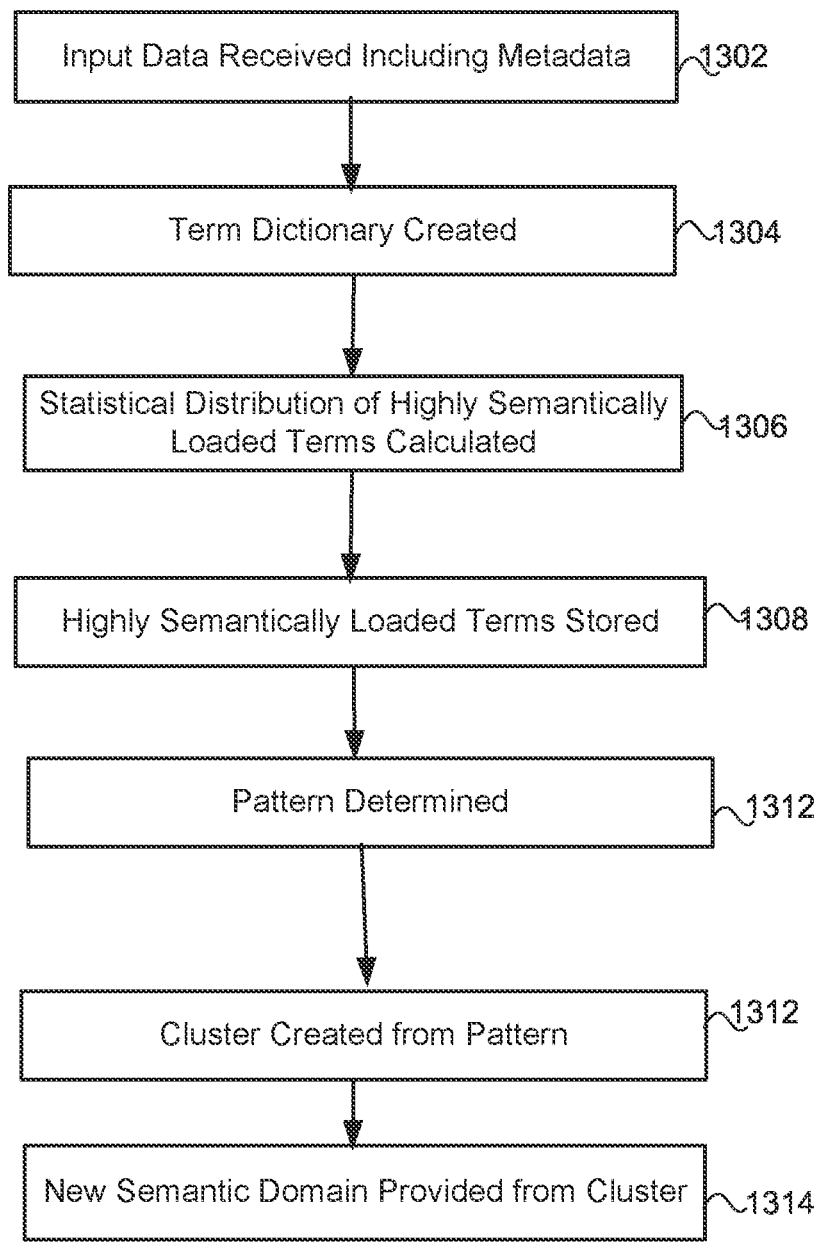
FIG. 13 shows a simplified flow diagram of a method according to an embodiment.

FIG. 13 is a flow diagram of a method 1300 according to an embodiment. At 1302, input data is received comprising metadata defining existing semantic domains and defining d.g. domains (or other non-semantical knowledge category). At 1304 a list of term dictionary structures is created. At 1306, the list of term dictionary structures, a data governance domain database, and a term database are referenced to calculate a statistical distribution of highly semantically loaded terms in the input data.

At 1308, the highly semantically loaded terms are stored in a non-transitory computer readable storage medium. At 1310, patterns of statistical distribution of the highly semantically loaded terms are determined.

At 1312 a cluster of the highly semantically loaded terms is created according to the pattern. At 1314 a new semantic domain is provided based upon the cluster.

Further details regarding domain reduction according to various embodiments, are now provided in connection with the following example. This example uses terminology of the SAPTerm database available from SAP SE of Walldorf Germany, in order to suggest domain assignment for translation data.

Example

The approach of this example, combines data and information from different SAP tools and corresponding data sets, in order to obtain missing input as well as consistent, reliable insights for the translation solution. In particular, terminology of the SAPTerm database is useful because such terms may accurately serve as semantical signifiers for specific semantical categories.

Not all such SAPTerm terms may be useful. Accordingly, "highly semantically loaded" terms are first determined.

Such highly semantically loaded terms are not commonly used. To determine them, we explore statistical distribution of SAPTerm database terms amongst business areas/categories, using Automated Clearing House (ACH), which are used in the manner of data governance domains. Terms which are too general (e.g., appear with high frequency), are filtered out.

Then, we explore patterns of distribution of the "highly semantically loaded" terms over translation data. Based on that distribution, different domain assignments are suggested.

Translation domains sharing a (small) set of "highly semantically loaded" terminology with each other (but not with other domains), are candidates for overlapping domains. Thus, such translation domains having a large set of exclusive "highly semantically loaded" terminology, are likely to be correctly defined domains.

New domains could be saved as metadata in translation data, and then later confirmed automatically/manually by translators later over a longer period.

An embodiment according to this example may:
define new semantical domains in linguistic data,
improve existing domains in linguistic data, and/or
improve the distribution of linguistic data over these semantical domains.

Figure 2:
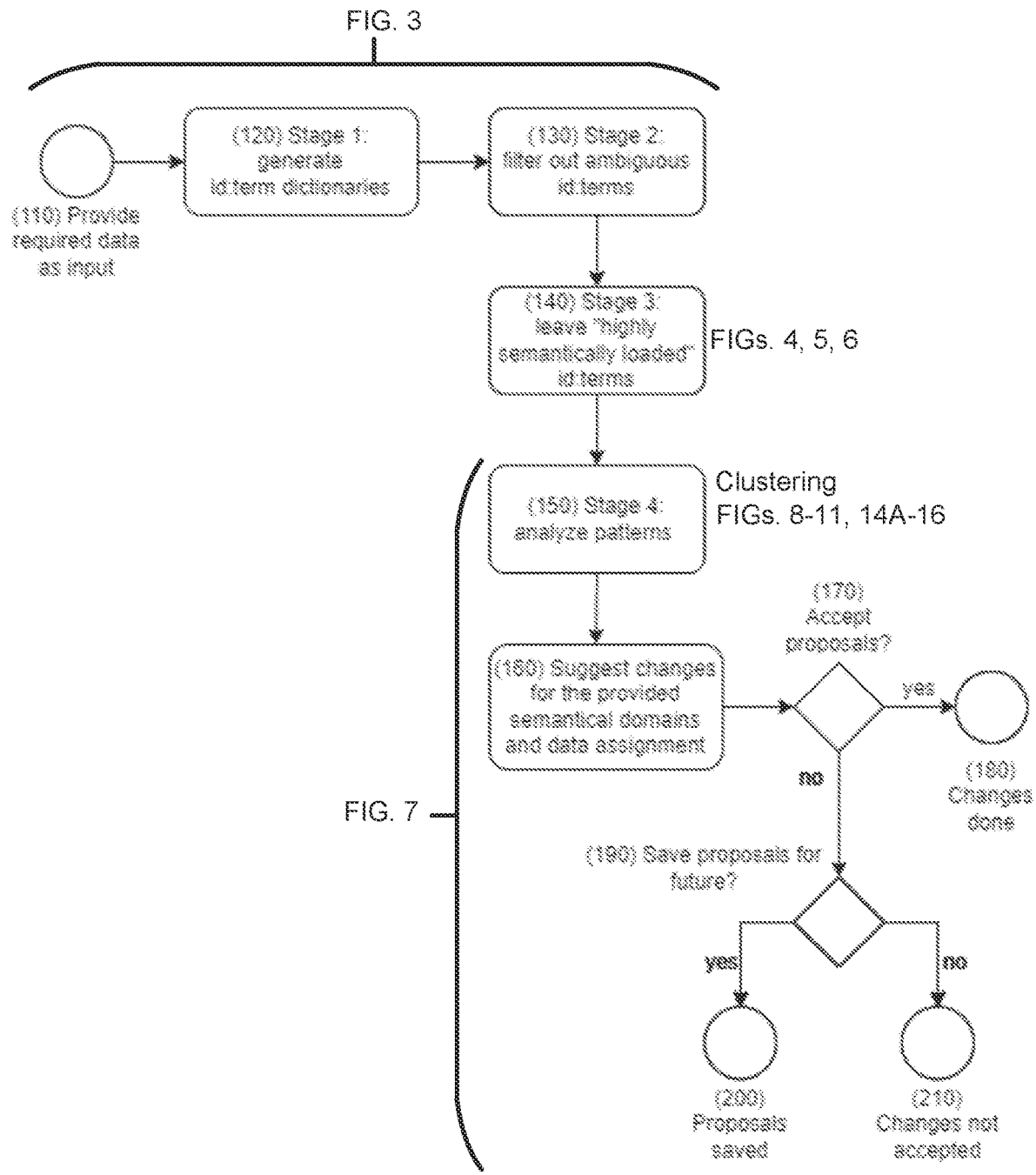
FIG. 2 shows details of a first and second stage according to the example.

FIG. 1 shows a sample architecture that may be utilized to implement domain assignment according to this example. FIG. 2 shows an overview of the exemplary embodiment.

Figure 3:
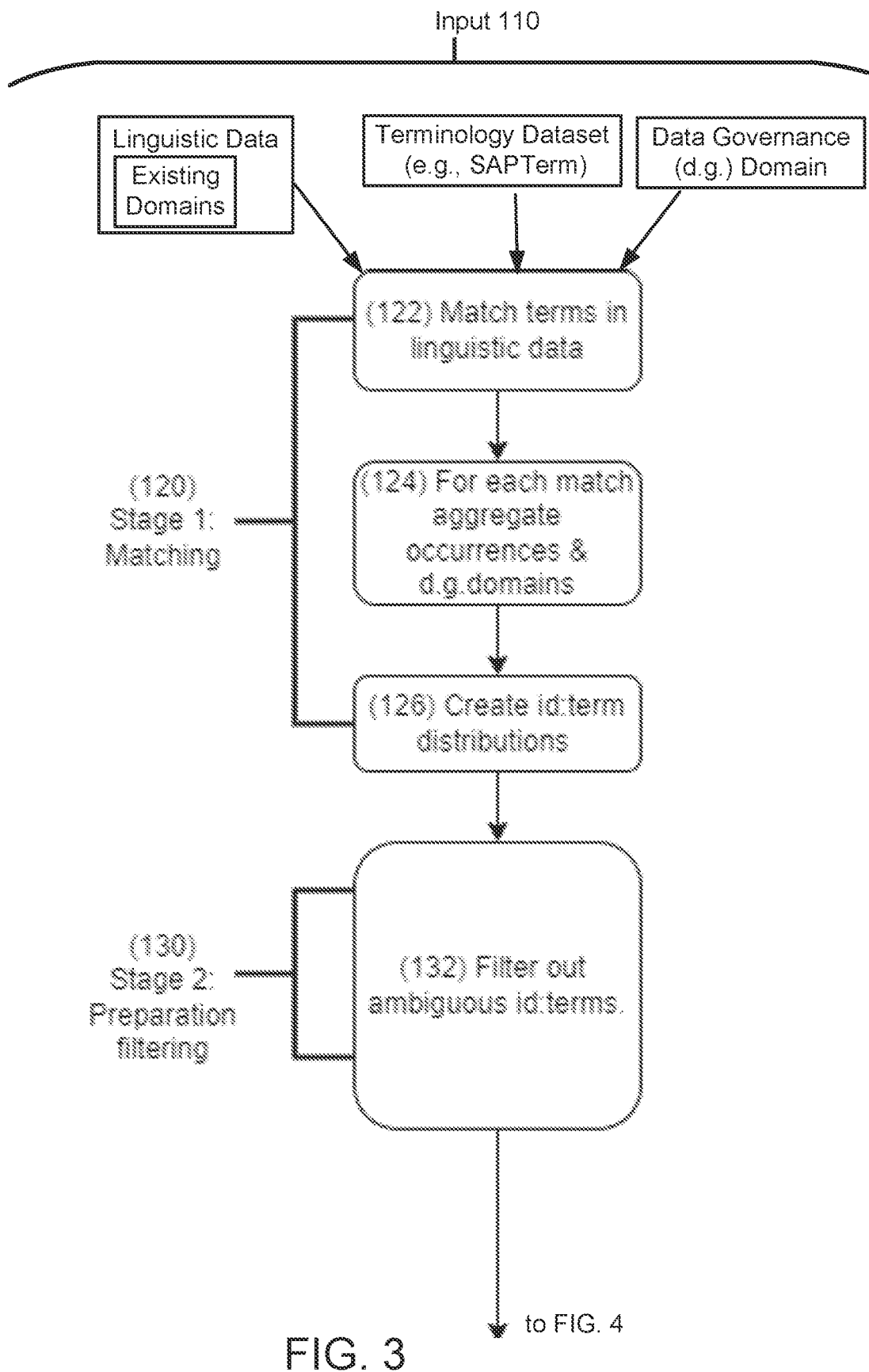
FIGS. 3-5 show details of a third stage according to the example.
Figure 4:
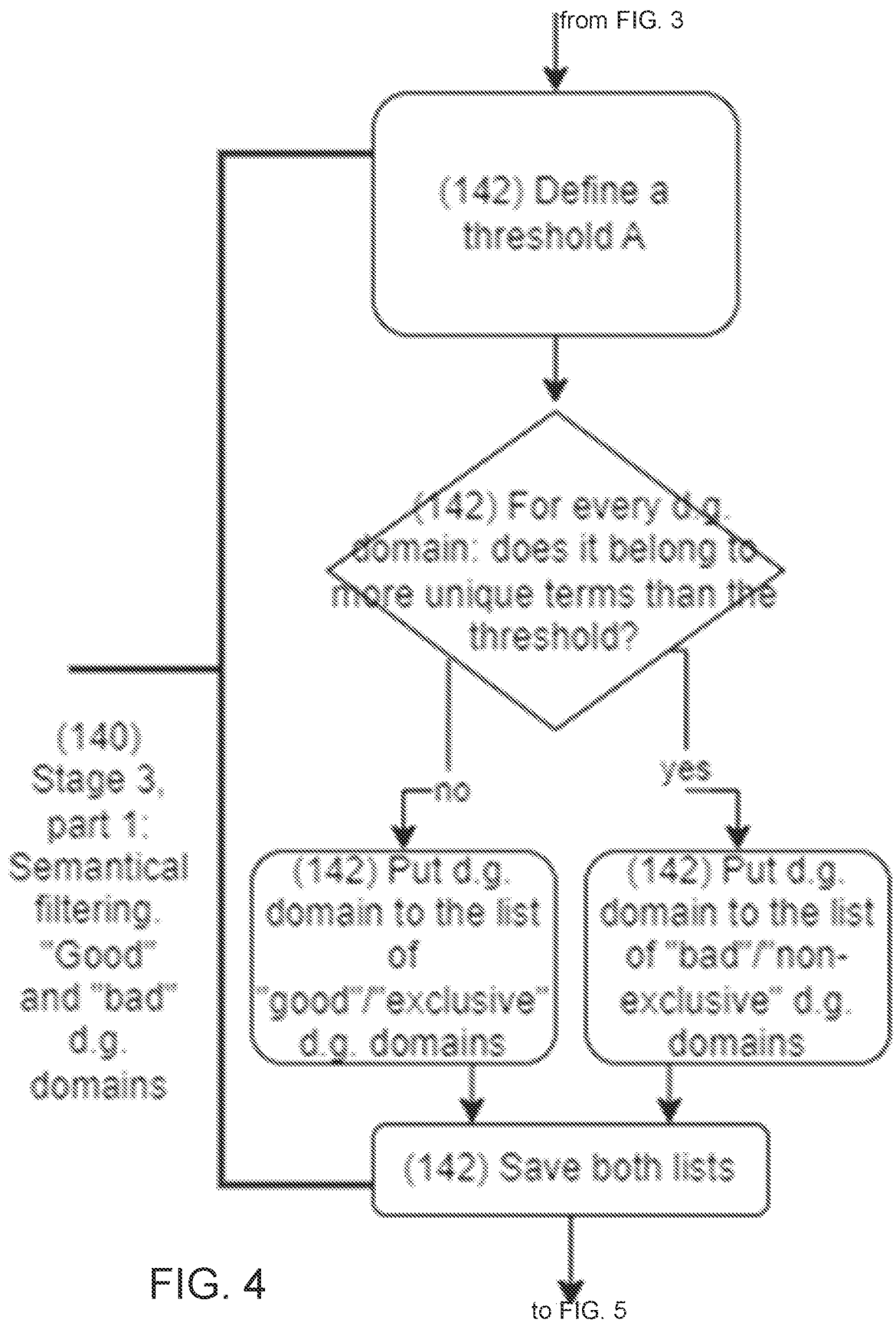
Figure 5:
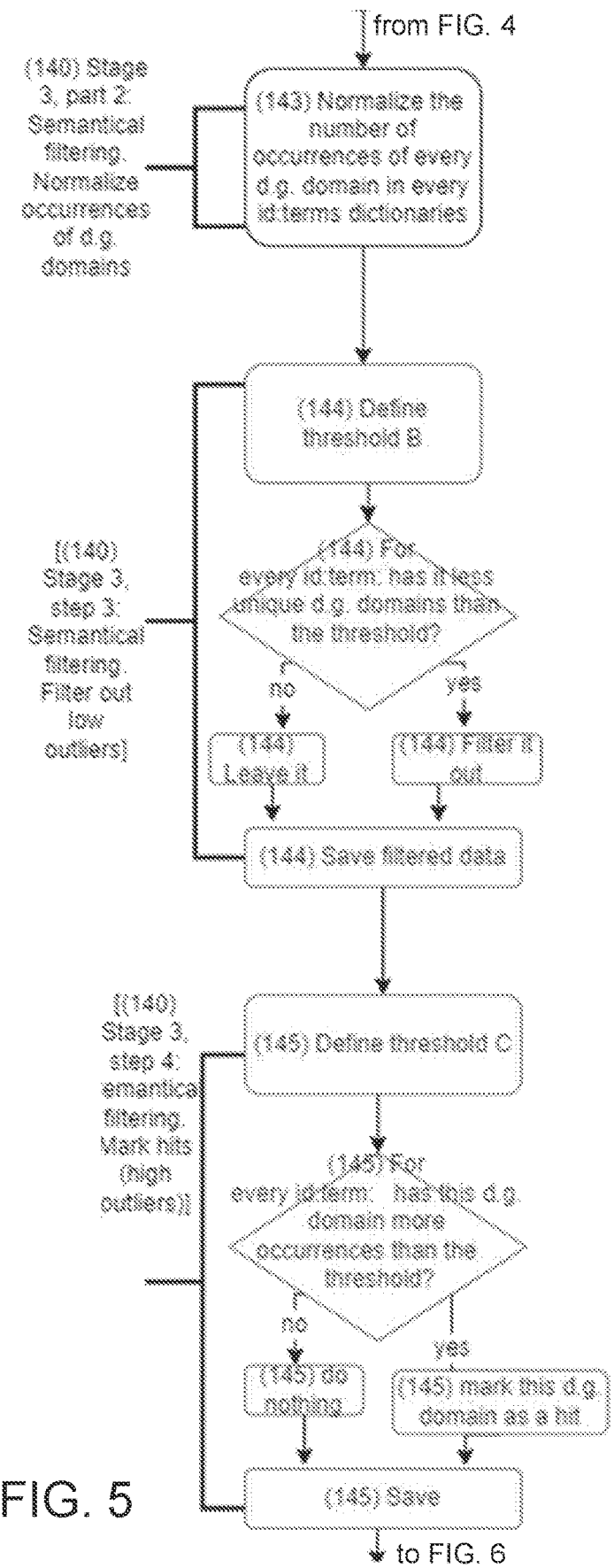

As input (110), an exemplary system 100 consumes one or more of:
incoming linguistic data,
existing semantical domains,
terms from the terminology data set, and
data governance ("d.g.") domains, During the stages 1-3 (120-140) of domain reduction according to an embodiment, the engine matches the terms in linguistic data and calculates "semantical load" of every matched term, considering the distribution of data with terms over data governance domains. FIG. 2 (discussed below) shows details of the stages 1 and 2. FIGS. 3-5 (also discussed below) show details of various parts of the stage 3.

The "highly semantically loaded" terms are then used in stage 4 (150) as semantical separators/signifiers to define semantical domains, and improve data assignment to these domains. As is further described in detail below, at least two approaches are possible to cluster the data based on pattern of the found semantical signifiers.

As output (160), the exemplary system provides proposals for changes in the existing semantical domains and data assignment to these domains. A human present in the loop may confirm (180) the proposals.

The new semantical domains could be saved (200) as metadata in data management system, and confirmed automatically or manually by data users later during a longer period.

Alternatively, the new semantical domains may not be saved (210). FIG. 7 (discussed later below) shows details of stage 4 and later in the example.

In order to achieve domain assignment, embodiments determine "Highly semantically loaded" (useful) terms having only certain (e.g., less than a pre-defined threshold) d.g. domains assigned. These reflect a saturated, specific meaning for a semantical domain.

The high semantically loaded terms are useful semantic separators (signifiers). They do not frequently appear within different hierarchical categories (d.g. domains) of the linguistic data.

By contrast, the remaining terms are "Not enough semantically loaded" terms. These other terms are not practically useful for domain reduction.

That is, they represent terminology which is assigned to a large (e.g., greater than the pre-defined threshold) number of d.g. domains. Such terminology is used in linguistic data in too many hierarchical categories (d.g. domains), and thus occurs frequently within different topics of linguistic data. This terminology is considered too general to reliably function as an accurate specifier for a semantical domain.

FIG. 2 shows details of the first and second stages of the example process of FIG. 1. As input (110), a user provides the following data for the system.

Linguistic data 101 is for at least one human language, and optionally may be multilingual in more complex embodiments. The linguistic data includes the one or more of the following types of metadata.

A first metadata type of the input linguistic data, is an existing semantical domain. A Semantical domain (or subject field) is a topic or a field of knowledge, to which linguistic data refers. Possible examples of semantic domains, can include but are not limited to:
finance,
immunology,
politics,
environmental law,
molecular biology, and
many, many others.

Embodiments seek to improve, define more precisely, and/or reduce a number of these domains in a data set.

A second metadata type of the input linguistic data, is a data governance ("d.g.") domain. A data governance domain is a logical grouping of items of interest to the organization, or areas of interest within the organization.

These represent high-level categories of data for the purpose of assigning accountability and responsibility for the data—e.g., Human Resources (HR) functionalities, specific products, or many others. Alternatively, d.g. domains may refer to other non-semantical categories in linguistic data maintained as metadata.

A second input 102 is an industry- or company-specific terminology dataset with terms in the same language(s) as the linguistic data. Such a terminology dataset can be referenced in order to distinguish uniqueness of the ambiguous terms (same representation, different meaning).

Here, "id:term" allows distinguishing "terms" with the same form but different meaning with different ids. As an example, "1:Apple" can be an id:term with a first semantical meaning of the word "apple" (fruit), and "2:Apple" can be an id:term with a second semantical meaning of the word "apple" (company).

Stage 1 (120) matches terms and aggregate id:term dictionary structures. At (122), every id:term from the terminology dataset is matched in the linguistic data. For this matching, case-insensitive exact match or techniques more sophisticated than exact matching, can be employed.

Zero or low number of false positives in matches may be required. If bilingual or multilingual linguistic data was used in 110 as input, the term match may need to be found in all available languages—thereby decreasing ambiguity of data.

At (124), for each matched id:term, the following is stored:
its occurrences in data,
occurrences of the d.g. domains; and
other metadata.

Then at (126) for every id:term, an id:term dictionary structure is aggregated. The following is an example of one id:term dictionary:

```
{"1": "Apple",
    "occurrences": 5,
    "d.g.domains":
        ("area_1": 3,
        "area_4": 2).
    "old semantical domains":
        ("health",
        "finances"),
    "matched in lines":
        (68, 110, 375, 2, 87)
}
```

-continued

The output of the stage 1 (120) is a list of the id:term dictionary structures.

Stage 2 (130) shows preparation filtering. Specifically, at step 132, the remaining ambiguous id:terms are filtered out. Output of the stage 2 (130) is thus likely a shorter list of the id:term dictionary structures.

Figure 6:
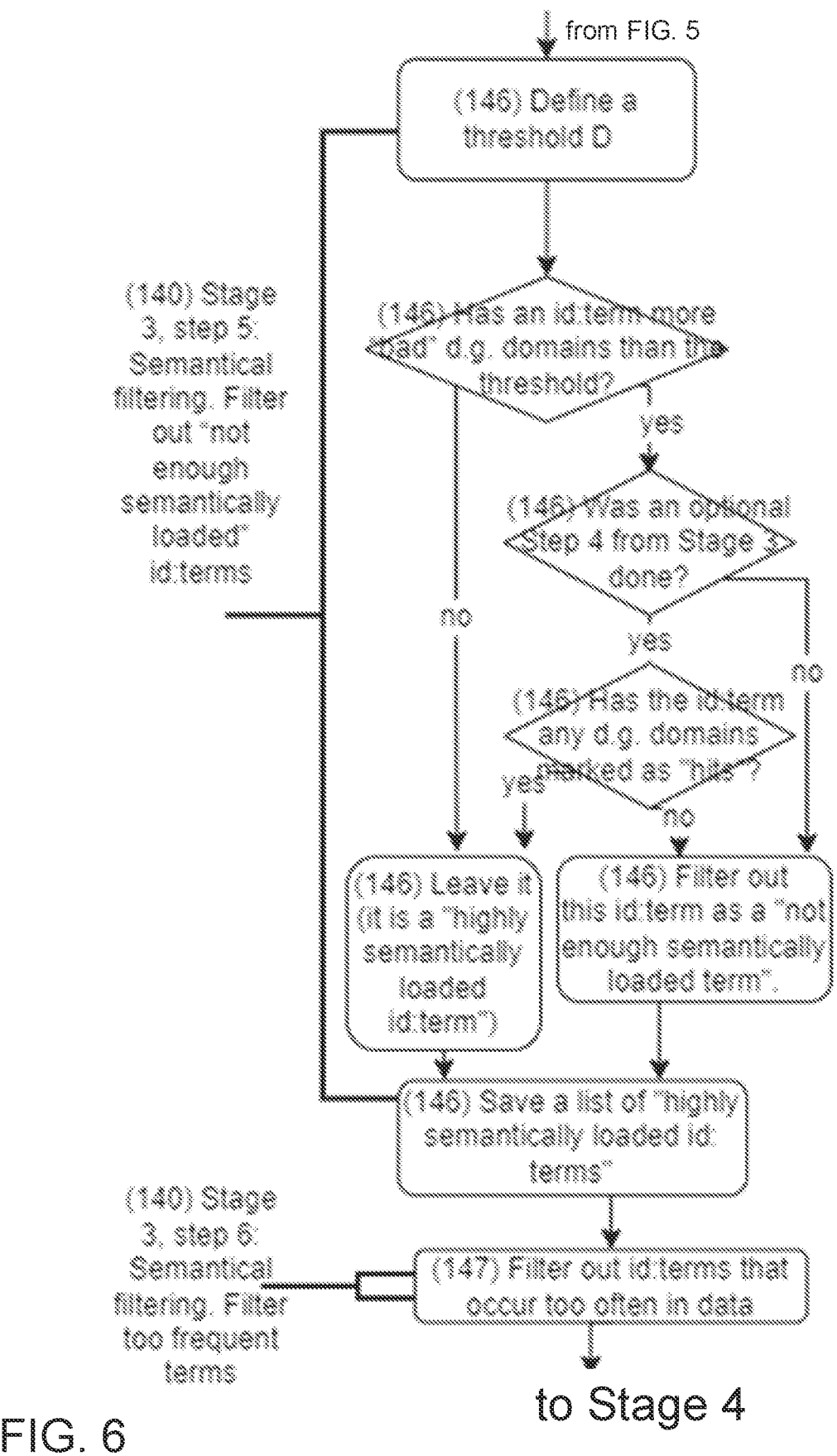

Semantic filtering is performed in stage 3 (140). FIGS. 4-6 provide details according to this particular example.

At 142, a first threshold (A) for maximum number of the unique terms matched within one d.g. domain, is defined. The $1^{st}$ threshold is a configurable value which can be adjusted.

Depending upon the particular embodiment, this threshold can be defined:
 by a human;
 automatically based on a small test setup;
 statistically.

An example of the statistical definition of the $1^{st}$ threshold could create a sorted histogram with group frequency distributions of unique terms per d.g. domain considering the amount of data, take a border value of the first bin on the histogram (min number of terms per d.g. domain with the highest number of occurrences in data) as a threshold.

Next, for every existing d.g. domain, the system calculates the number of the unique id:terms matched. If the d.g. domain has more unique id:terms than the threshold, the d.g. domain is saved as a list of "bad" ("non-exclusive") d.g. domains. Otherwise—saved as a list of "good" ("exclusive") d.g. domains.

Moving now to FIG. 5, at 143 occurrences of the d.g. domains in id:term dictionary structures (132) are normalized. For this, the system calculates the total number of occurrences of every d.g. domain in all id:terms. Then, for every d.g. domain in every id:term dictionary structure (132) the d.g. domain occurrence is divided through the total number of occurrences of the d.g. domain.

Optionally, at 144, the "lower outliers" are filtered out. For that, a threshold (B) for the number of unique d.g. domains per id:term within all data is defined. This definition of B may be by a human, done automatically, and/or done using any suitable statistical approaches).

The threshold B is a configurable value which can be adjusted. For every id:term dictionary structure (132) containing fewer d.g. domains than a threshold, it is filtered out as an "lower outlier".

Also optionally, at 145 the d.g. domains which are higher outliers (hits) are marked. For that purpose, a threshold (C) for the occurrences of d.g. domains for id:term dictionaries is defined (e.g., by a human/automatically/using any suitable statistical approaches). The threshold C is a configurable value which can be adjusted. For every d.g. domain in every id:term dictionary structure (132): if it has more occurrences than the threshold C, it marked as a "higher outlier".

Moving now to FIG. 6, at 146, a list of "highly semantically loaded id:terms" is created. For that purpose, a threshold D for the acceptable number of "bad" ("non-exclusive") d.g. domains per id:term is defined (by a human/automatically/using any suitable statistical approaches).

The threshold D is a configurable value which can be adjusted. For every id:term dictionary structure (132): if an id:term less "bad" ("non-exclusive") d.g. domains than the threshold D, it is saved in a list of "highly semantically loaded id:terms". Otherwise, it is filtered out.

However, an exception exists. If (optional) step 145 was performed, and an id:term dictionary structure has at least one d.g. domains marked as a "higher outlier", it is also saved in a list of "highly semantically loaded id:terms".

At 147, the system filters out id:terms that occur in linguistic data too often. This may be accomplished by defining a configurable threshold E. The output of stage 3 (140) is a list of "highly semantically loaded id:terms" and their dictionary structures.

Moving now to FIG. 7, stages occurring after stage 3 are shown. Stage 4 (150) involves the generation of suggestions for domains.

Specifically, at 152, distributions of the "highly semantically loaded id:terms" (output of 140) over the input linguistic data (110), are created. The patterns of distributions are statistically explored.

Then, the data is clustered based on the "highly semantically loaded id:terms" as semantical signifiers. For that clustering, two categories of term patterns in translation data may be defined and considered.

A first category considers only at distribution of terms across existing domains.
 A second category looking deeper and considers distribution of d.g. domains across the terms themselves, as well.

Details regarding a first clustering approach utilizing the first category of term patterns, are now described. For every current semantic domain with "highly semantically loaded" terms distributed over it, we check the distribution of these terms over other current semantic domains.

Figure 14A:
FIGS. 14A-C show outcomes according to a first clustering approach.
Figure 14B:
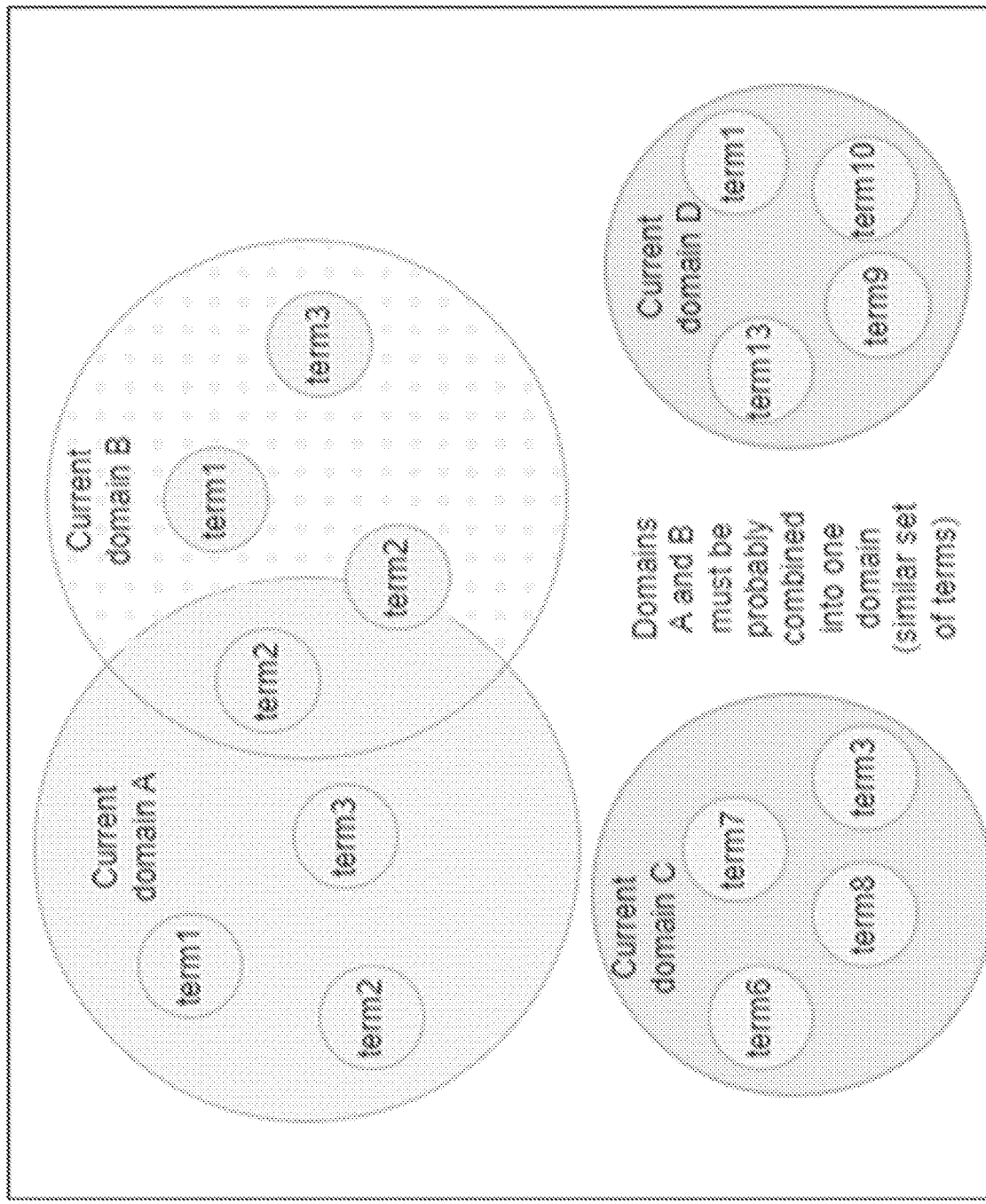
Figure 14C:
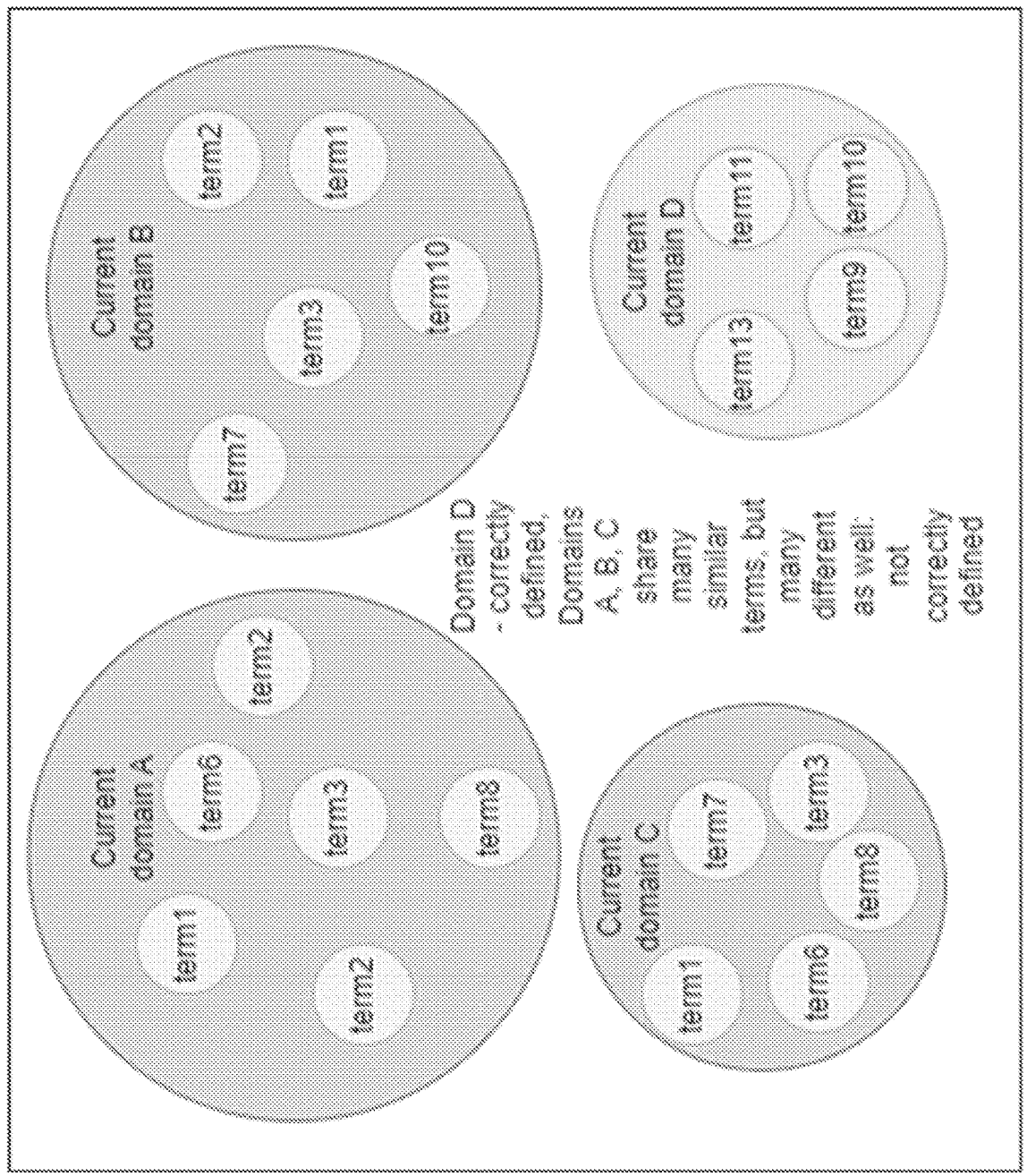

Based upon that distribution of terms over the current domains, the following outcomes may result.
 1) "Highly semantically loaded" terms occur only in one existing semantical domain. That is, an existing semantical domain has a large set of exclusive "highly semantically loaded" terms. This outcome is shown in FIG. 14A, and it indicates that the domains are correctly defined. The "highly semantically loaded" terms from every domain do not occur in other semantical domains, and so the current semantic domains are probably correct.
 2) "Highly semantically loaded" terms occur only in a few existing semantical domains. That is, current semantical domains share a small set of "highly semantically loaded" terms with each other, but not with other existing semantical domains. This outcome is shown in FIG. 14B, and it indicates that there are candidates of overlapping domains that may be consolidated to reduce their number. Here, the "highly semantically loaded" terms from domains A and B are similar and are candidates for overlapping domains (can be combined into one semantic domain).
 3) Existing semantical domains have "highly semantically loaded" terms also present in multiple other current semantical domains. This outcome is shown in FIG. 14C, and it indicates that the current domains may not be accurately assigned and revision is desirable. Here, domains A, B, C share many similar "highly semantically loaded" terms, but also other different "highly semantically loaded" terms, and are thus probably not correctly defined.

Figure 15A:
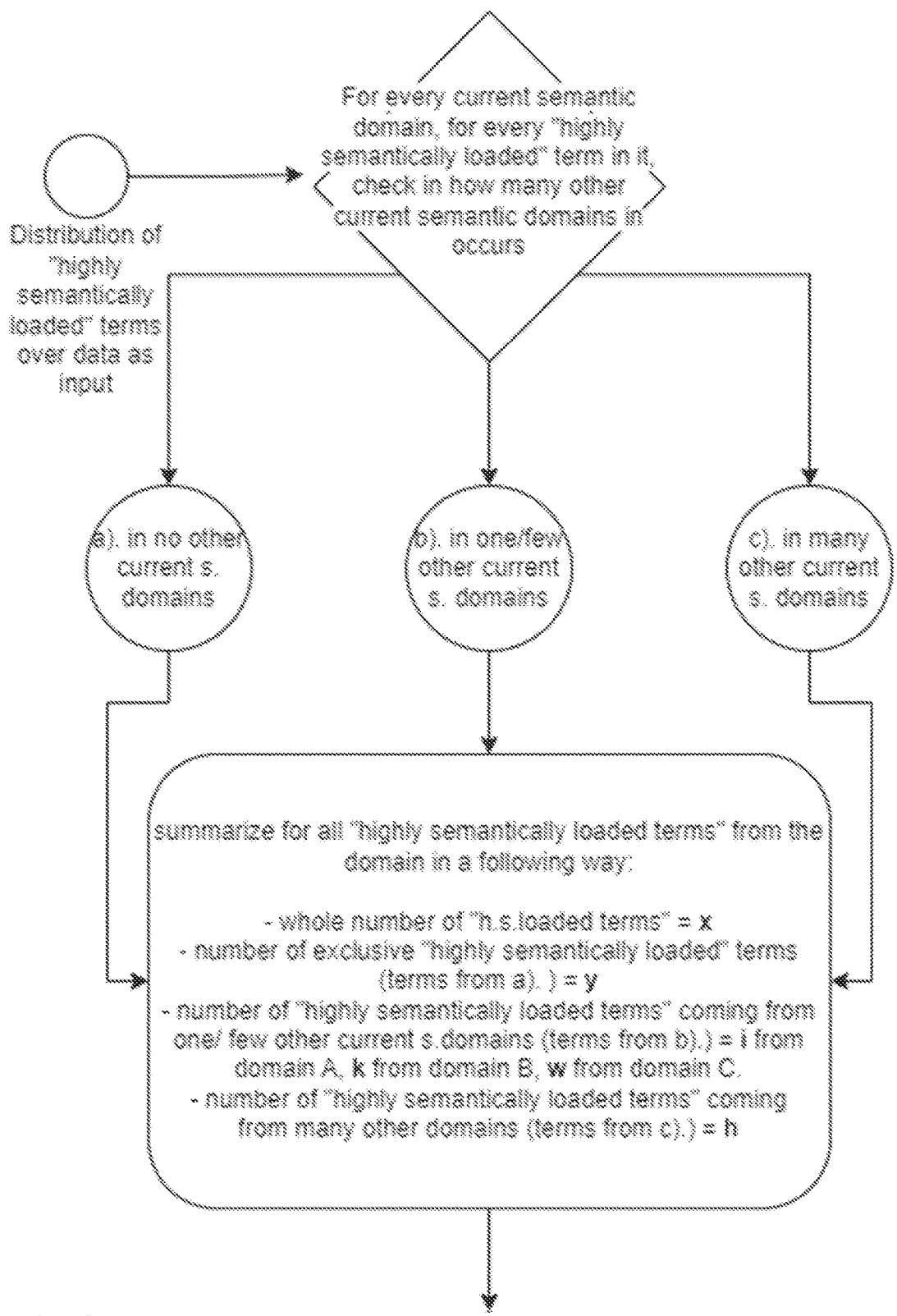
FIGS. 15A-B are simplified flow diagrams showing an embodiment of the first clustering approach.
Figure 15B:
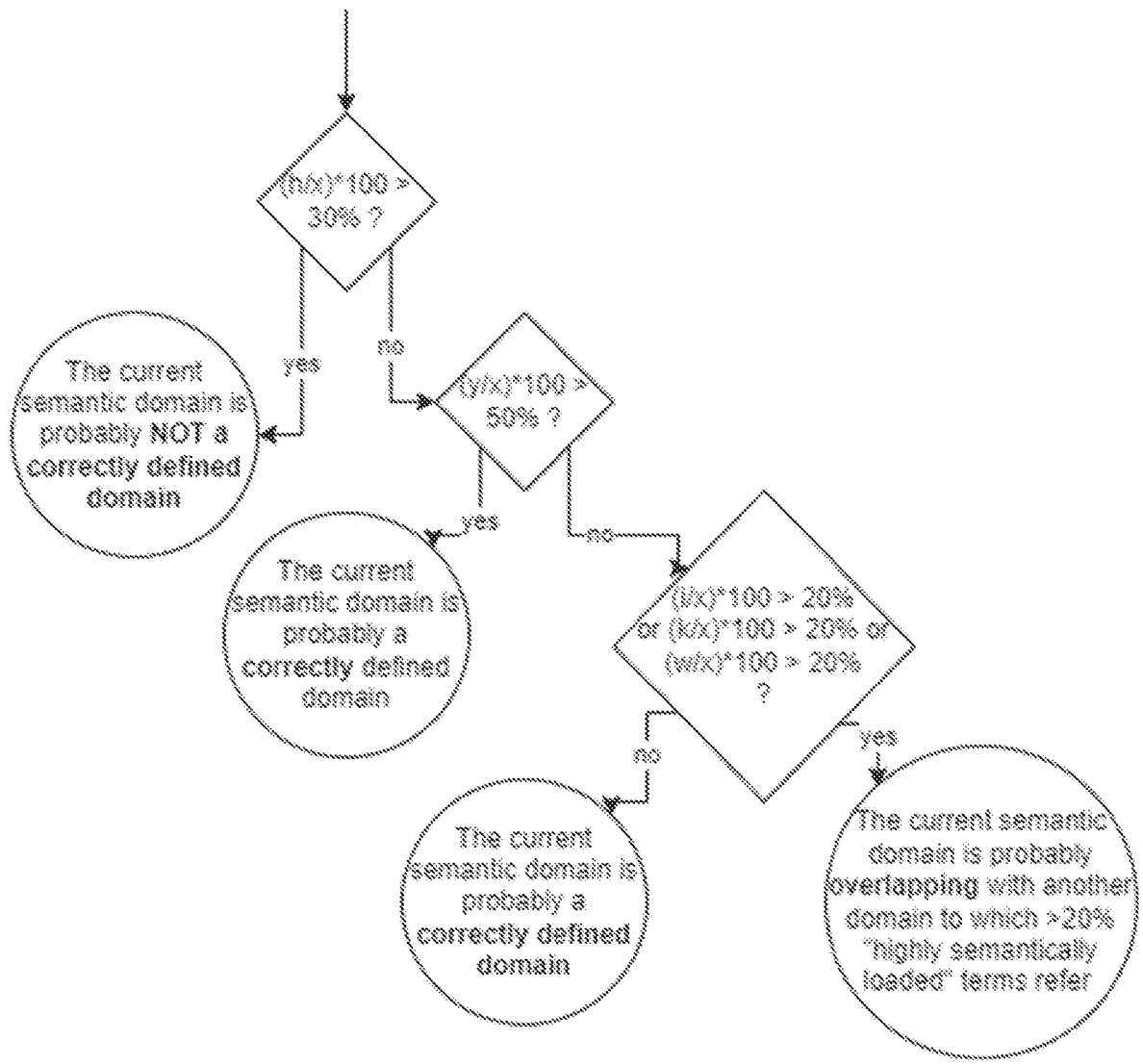

FIGS. 15A-B are flow diagrams illustrating clustering according to the first approach. This first clustering approach can use Natural Language Processing (NLP) and statistical techniques. These can involve one or more of:
 analyzing a statistical distribution;
 creating a visualization (e.g., a network graph);

performing machine learning;
other types of analysis.

The second category of term patterns looks deeper than the first category. This $2^{nd}$ clustering approach references the prior "highly semantically loaded" determination. That is, the second category pays attention to the distribution of d.g. domains across the terms as well.

Domains sharing a small set of "highly semantically loaded" terminology with each other (but not with other domains), are candidates for overlapping domains. And, translation domains that have a large set of exclusive "highly semantically loaded" terminology, are probably correctly defined domains.

This second category of term patterns utilizes a mapping of the data governance domains to the existing semantic domains. That is, based upon the following:

mapping of the data governance domains to the existing semantic domains;
"highly semantically loaded terms" in current semantic domains;
the tables of FIGS. 8-11;
distribution of d.g. domains over current semantic domains,
improved domain assignments can be suggested.

We take "semantically loaded" terms having at least one d.g. domain assigned. In the resulting list, we compare the distribution of d.g. domains across the terms according to the tables shown in FIGS. 8-11.

In turn, we receive candidates for semantical domains that are:

correctly/probably correctly defined (FIGS. 8-11),
overlapping/probably overlapping (FIGS. 9-10),
not correctly/probably not correctly defined (FIG. 11).

Figure 16:
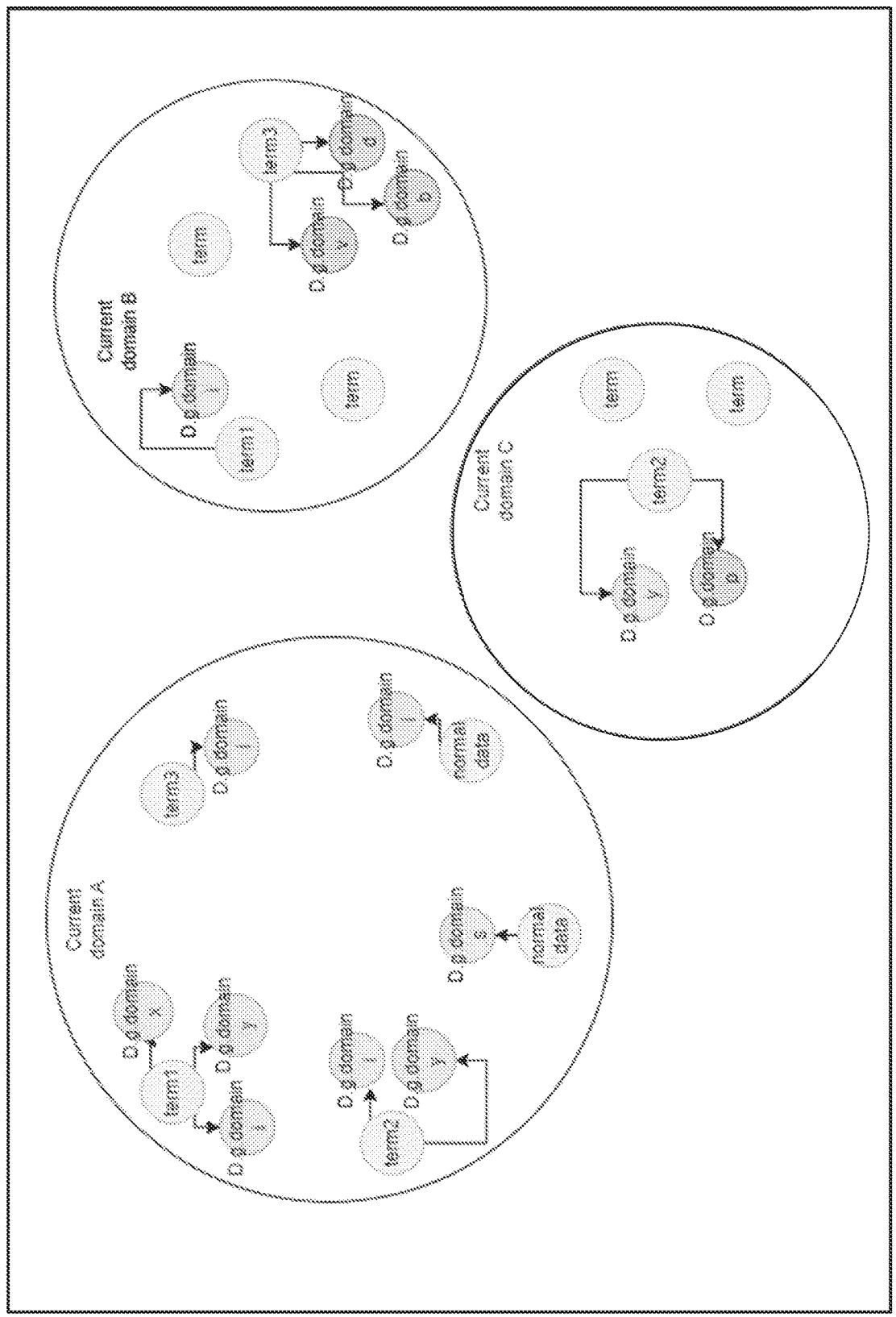
FIG. 16 shows outcomes according to a second clustering approach.

FIG. 16 shows an example of the second approach to clustering. Here, for every domain "abc":

1) Create a list of the data governance domains, assigned to data from it.
Domain A:
d.g. domain x
d.g. domain y
d.g. domain i
d.g. domain s
2) Take "highly semantically loaded" terms from it that have at least one of the d.g. domains assigned to it that belongs to the list created in 1).
Term 1, term 2 and term 3.
3) For every term from 2), create a list of the d.g. domains that are assigned to it in the current semantic domain "abc" and also in other current semantic domains.

term1:
from domain A:
d.g. domain x
d.g. domain y
d.g. domain i
from domain B:
d.g. domain i (available also in A)
term2:
from domain A:
d.g. domain i
d.g. domain y
from domain C:
d.g. domain y
d.g. domain p
term3:
from domain A:
d.g. domain i
from domain B:

d.g. domain v
d.g. domain d
d.g. domain b

4) In the resulting list we compare the distribution of d.g. domains across the terms 3) with the tables of FIGS. 8-11. Thus we obtain candidates for semantical domains that are:

correctly/probably correctly defined,
overlapping/probably overlapping,
not correctly/probably not correctly defined Turning now to the specific example of FIG. 16, Term 1 shares many d.g. domains from the list of d.g. domains of Domain A, but shares no other d.g. domains from other domains (e.g., B, C). Accordingly, current Domain A is probably already a correctly defined domain (based upon the "one/several/many-to-zero" relation from FIG. 8).

Term 2 shares many d.g. domains from the list of d.g. domains of Domain A, and shares only one other d.g. domain from the list of d.g. domains of domain B. Hence, Domain A is probably a correctly defined domain. Domain B is a candidate for an overlapping domain (based upon the "one/several/many-to-one" relation from the table of FIG. 9).

Term 3 has one d.g. domain from the list of domains from Domain A, and shares many other d.g. domains from the list of domains of domain B. Hence, it is probably not a correctly defined domain (based upon the "one/several/many-to-many" relation from the table of FIG. 11).

Returning now to FIG. 7, the output of the stage 4 (150) is a list of suggestions of the system to change the existing semantical domains (110). That is data may be assigned to domains in a new way.

At 160, a system provides suggestions for changes in the existing semantical domains and data assignment to these domains to the user. As shown back in FIG. 1, a human in the loop can be used to confirm (180) the suggestions.

The new semantical domains could be also saved (200) as metadata in data management system and be confirmed automatically or manually by data users later during a longer period. If the proposals are not suitable, they can be declined (210).

Returning now to FIG. 12, while that figure shows a particular embodiment with the domain engine as being located outside the database, this is not required. Rather, alternative embodiments could leverage the processing power of an in-memory database engine (e.g., the in-memory database engine of the HANA in-memory database available from SAP SE), in order to perform one or more various functions as described above.

Figure 17:
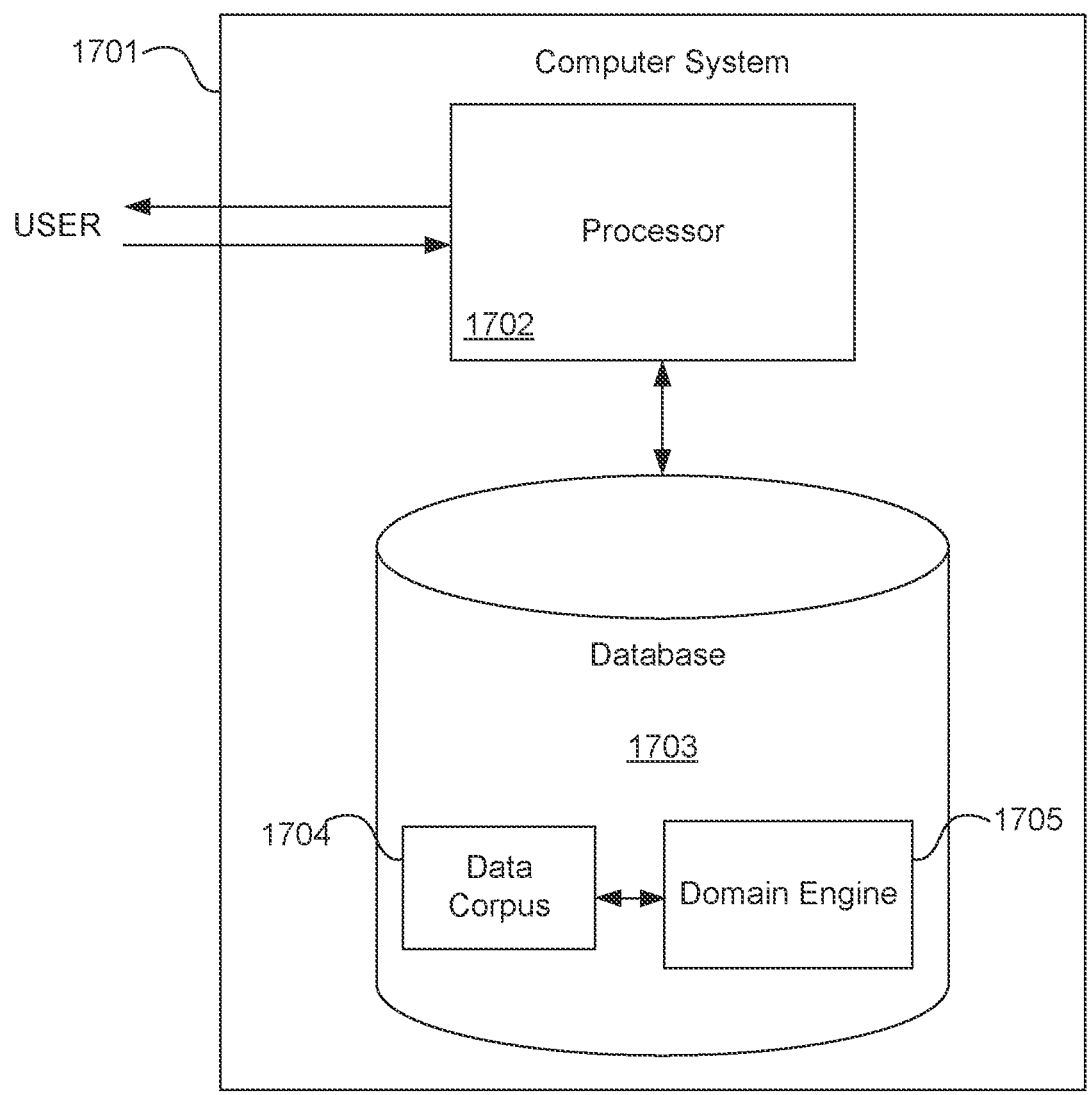
FIG. 17 illustrates hardware of a special purpose computing machine configured to implement semantic domain assignment according to an embodiment.

Thus FIG. 17 illustrates hardware of a special purpose computing machine configured to perform domain assignment according to an embodiment. In particular, computer system 1701 comprises a processor 1102 that is in electronic communication with a non-transitory computer-readable storage medium comprising a database 1703. This computer-readable storage medium has stored thereon code 1705 corresponding to a domain engine. Code 1704 corresponds to a data corpus. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Embodiments as described herein may offer one or more advantages. One potential benefit is compatibility with input comprising big data. That is, having individual human domain experts manually assign domains to large data volumes can be laborious, time-consuming, and/or costly.

Another benefit is improved operation. That is, having a refined, efficient set of assigned domains can reduce the burden on the computer tasked with the subsequent analysis (e.g., NLP). Embodiments can achieve this by consolidating redundant or overlapping domains that have been previously assigned.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented systems and methods comprising:
  receiving input data including metadata defining an existing semantic domain within the input data and governance domains within the input data;
  creating a list of term dictionary structures from the input data;
  referencing the list of term dictionary structures and a term database to calculate a statistical distribution of highly semantically loaded terms in the input data; and
  storing the highly semantically loaded terms in a non-transitory computer readable storage medium.

Example 2. The computer implemented systems or methods of Example 1 further comprising:
  determining a pattern of statistical distribution of the highly semantically loaded terms; and creating a cluster of the highly semantically loaded terms according to the pattern.

Example 3. The computer implemented systems or methods of Example 2 further comprising:
  providing a suggestion of a new semantic domain based on the cluster; and receiving an acceptance to the suggestion.

Example 4. The computer implemented systems or methods of Example 3 wherein the pattern is across the input data.

Example 5. The computer implemented systems or methods of Example 3 wherein the pattern is across the governance domains.

Example 6. The computer implemented systems or methods of Examples 1, 2, 3, 4, or 5 further comprising referencing the term database to disambiguate a term of the input data.

Example 7. The computer implemented systems or methods of Examples 1, 2, 3, 4, 5, or 6 further comprising filtering a term of the input data that appears with a high frequency.

Example 8. The computer implemented systems or methods of Examples 1, 2, 3, 4, 5, 6, or 7 further comprising using the highly semantically loaded terms as features for neural machine translation.

Example 9. The computer implemented systems or methods of Examples 1, 2, 3, 4, 5, 6, 7, or 8 further comprising using the highly semantically loaded terms as labels automatically assigned to newly received translation data.

Figure 18:
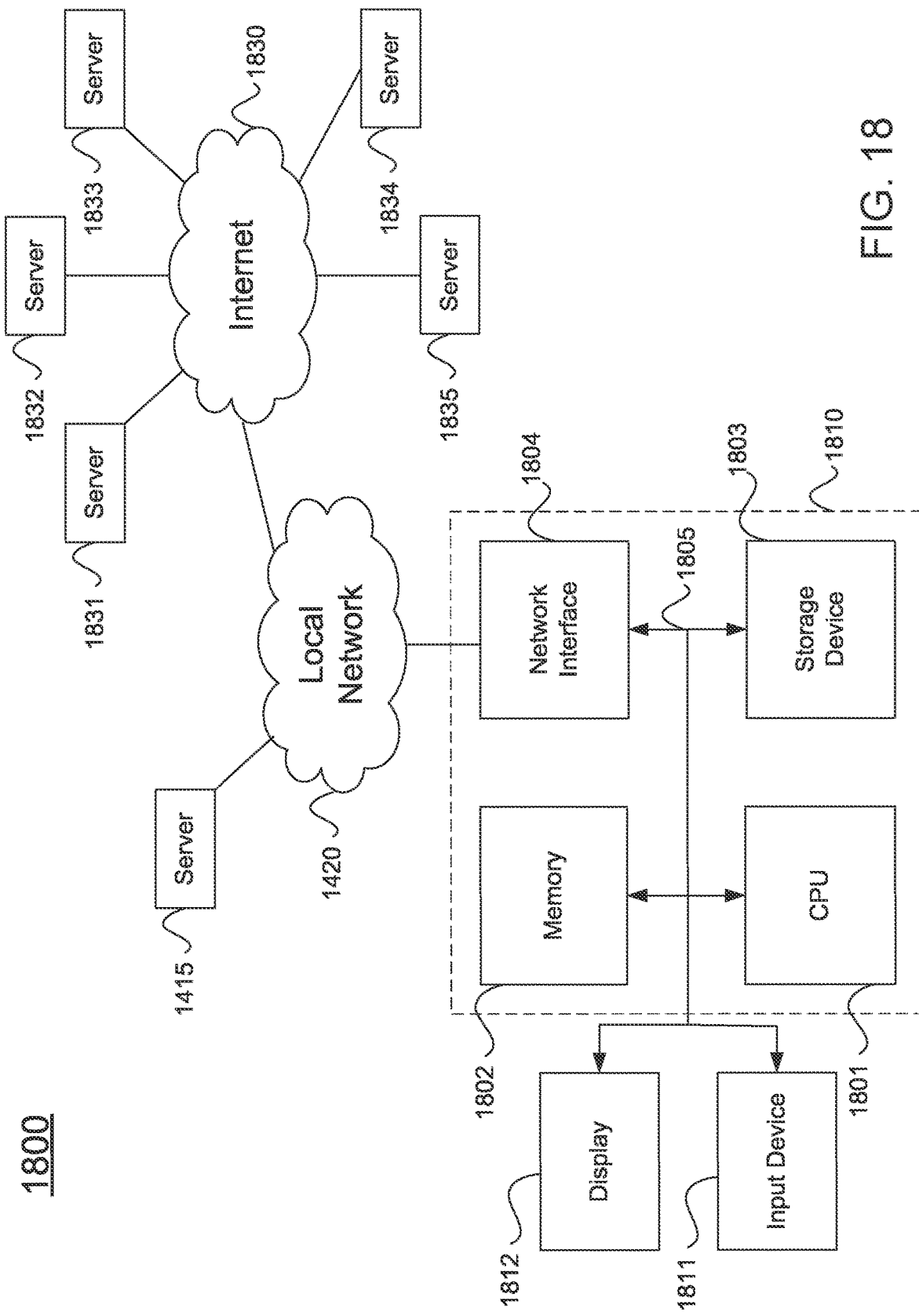
FIG. 18 illustrates an example computer system.

An example computer system 1800 is illustrated in FIG. 18. Computer system 1810 includes a bus 1805 or other communication mechanism for communicating information, and a processor 1801 coupled with bus 1805 for processing information. Computer system 1810 also includes a memory 1802 coupled to bus 1805 for storing information and instructions to be executed by processor 1801, including information and instructions for performing the techniques described above, for example. This memory may also be used for storing variables or other intermediate information during execution of instructions to be executed by processor 1801. Possible implementations of this memory may be, but are not limited to, random access memory (RAM), read only memory (ROM), or both. A storage device 1803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1803 may include source code, binary code, or software files for performing the techniques above, for example. Storage device and memory are both examples of computer readable mediums.

Computer system 1810 may be coupled via bus 1805 to a display 1812, such as a Light Emitting Diode (LED) or liquid crystal display (LCD), for displaying information to a computer user. An input device 1811 such as a keyboard and/or mouse is coupled to bus 1805 for communicating information and command selections from the user to processor 1801. The combination of these components allows the user to communicate with the system. In some systems, bus 1805 may be divided into multiple specialized buses.

Computer system 1810 also includes a network interface 1804 coupled with bus 1805. Network interface 1804 may provide two-way data communication between computer system 1810 and the local network 1820. The network interface 1804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1204 sends and receives electrical, electromagnetic, or optical signals that carry digital data streams representing various types of information.

Computer system 1810 can send and receive information, including messages or other interface actions, through the network interface 1804 across a local network 1820, an Intranet, or the Internet 1830. For a local network, computer system 1810 may communicate with a plurality of other computer machines, such as server 1815. Accordingly, computer system 1810 and server computer systems represented by server 1815 may form a cloud computing network, which may be programmed with processes described herein. In the Internet example, software components or services may reside on multiple different computer systems 1810 or servers 1831-1835 across the network. The processes described above may be implemented on one or more servers, for example. A server 1831 may transmit actions or messages from one component, through Internet 1830, local network 1820, and network interface 1804 to a component on computer system 1810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method for improving accuracy and efficiency of natural language processing performed by a processor, the method comprising:
   receiving linguistic data including metadata defining an existing semantic domain comprising a field of knowledge to which the linguistic data refers and governance domain comprising a logical grouping of items of interest to an organization;
   receiving an industry specific terminology dataset in a same language as the linguistic data;
   creating a list of term dictionary structures from the linguistic data and industry specific terminology, thereby distinguishing terms with a same form but different meanings by using different identifiers;
   generating a filtered list of dictionary structures by filtering out ambiguous terms from the list of dictionary structures;
   referencing the filtered list of term dictionary structures and a term database to calculate a statistical distribution of highly semantically loaded terms in the linguistic data;
   storing the highly semantically loaded terms in a non-transitory computer readable storage medium;
   performing natural language processing using the highly semantically loaded terms, wherein the highly semantically loaded terms improve reuse of data and quality of services;
   determining a pattern of statistical distribution of the highly semantically loaded terms;
   creating a cluster of the highly semantically loaded terms according to the pattern;
   providing a suggestion of a new semantic domain based on the cluster; and
   receiving an acceptance to the suggestion.

2. The computer-implemented method of claim 1 wherein the pattern is across the linguistic data.

3. The computer-implemented method of claim 1 wherein the pattern is across the governance domain.

4. The computer-implemented method of claim 1 further comprising referencing the term database to disambiguate a term of the linguistic data.

5. The computer-implemented method of claim 1 further comprising filtering a term of the linguistic data that appears with a high frequency.

6. The computer-implemented method of claim 1 further comprising using the highly semantically loaded terms as features for neural machine translation.

7. The computer-implemented method of claim 1 further comprising using the highly semantically loaded terms as labels automatically assigned to newly received translation data.

8. A non-transitory computer readable storage medium storing a set of instructions, that, when executed by a processor of a device, cause the device to perform operations comprising:
   receiving linguistic data including metadata defining an existing semantic domain comprising a field of knowledge to which the linguistic data refers and governance domain comprising a logical grouping of items of interest to an organization;
   receiving an industry specific terminology dataset in a same language as the linguistic data;
   creating a list of term dictionary structures from the linguistic data and industry specific terminology, thereby distinguishing terms with a same form but different meanings by using different identifiers;
   generating a filtered list of dictionary structures by filtering out ambiguous terms from the list of dictionary structures;
   referencing the filtered list of term dictionary structures and a term database to calculate a statistical distribution of highly semantically loaded terms in the linguistic data;
   storing the highly semantically loaded terms in a non-transitory computer readable storage medium;
   determining a pattern of statistical distribution of the highly semantically loaded terms;
   creating a cluster of the highly semantically loaded terms according to the pattern;
   providing a suggestion of a new semantic domain based on the cluster;
   receiving an acceptance to the suggestion;
   performing natural language processing using the highly semantically loaded terms, wherein the highly semantically loaded terms improve reuse of data and quality of services;
   determining a pattern of statistical distribution of the highly semantically loaded terms;
   creating a cluster of the highly semantically loaded terms according to the pattern;
   providing a suggestion of a new semantic domain based on the cluster; and
   receiving an acceptance to the suggestion.

9. The non-transitory computer readable storage medium of claim 8 wherein the pattern is across the linguistic data.

10. The non-transitory computer readable storage medium of claim 8 wherein the pattern is across the governance domain.

11. The non-transitory computer readable storage medium of claim 8 wherein the operations further comprise referencing the term database to disambiguate a term of the linguistic data.

12. The non-transitory computer readable storage medium of claim 8 wherein the operations further comprise filtering a term of the linguistic data that appears with a high frequency.

13. A computer system comprising:
   one or more processors configured to access code stored in a memory to perform operations comprising:
      receive linguistic data including metadata defining an existing semantic domain comprising a field of knowledge to which the linguistic data refers and governance domain comprising a logical grouping of items of interest to an organization;
      receiving an industry specific terminology dataset in a same language as the linguistic data;
      create a list of term dictionary structures from the linguistic data and industry specific terminology, thereby distinguishing terms with a same form but different meanings by using different identifiers;
      generating a filtered list of dictionary structures by filtering out ambiguous terms from the list of dictionary structures;
      reference the filtered list of term dictionary structures and a term database to calculate a statistical distribution of highly semantically loaded terms in the linguistic data;
      store the highly semantically loaded terms in a non-transitory computer readable storage medium; and performing natural language processing using the highly semantically loaded terms, wherein the highly semantically loaded terms improve reusage of data and quality of services;

determining a pattern of statistical distribution of the highly semantically loaded terms;

creating a cluster of the highly semantically loaded terms according to the pattern;

providing a suggestion of a new semantic domain based on the cluster; and receiving an acceptance to the suggestion.

14. The computer system of claim 13 wherein the pattern is across the linguistic data.

15. The computer system of claim 13 wherein the pattern is across the governance domain.

16. The computer system of claim 13 further configured to use the highly semantically loaded terms as at least one of, features for neural machine translation, and labels to be assigned automatically to newly received translation data.

* * * * *